(12) United States Patent
Tomida

(10) Patent No.: US 11,498,370 B2
(45) Date of Patent: Nov. 15, 2022

(54) PNEUMATIC TIRE

(71) Applicant: BRIDGESTONE CORPORATION, Tokyo (JP)

(72) Inventor: Tatsuya Tomida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 353 days.

(21) Appl. No.: 16/896,214

(22) Filed: Jun. 9, 2020

(65) Prior Publication Data

US 2020/0298628 A1 Sep. 24, 2020

Related U.S. Application Data

(63) Continuation-in-part of application No. PCT/JP2018/045347, filed on Dec. 10, 2018.

(30) Foreign Application Priority Data

Dec. 13, 2017 (JP) ............................. JP2017-239023

(51) Int. Cl.
*B60C 11/13* (2006.01)
*B60C 11/03* (2006.01)
*B60C 11/12* (2006.01)

(52) U.S. Cl.
CPC ............ *B60C 11/13* (2013.01); *B60C 11/032* (2013.01); *B60C 11/1236* (2013.01); *B60C 2011/0353* (2013.01); *B60C 2011/0355* (2013.01)

(58) Field of Classification Search
CPC ... B60C 11/13; B60C 11/032; B60C 11/1236; B60C 2011/0353; B60C 2011/0355
See application file for complete search history.

(56) References Cited

U.S. PATENT DOCUMENTS

2009/0272474 A1 11/2009 Nagai et al.
2010/0175799 A1* 7/2010 Takahashi ............... B60C 11/13
152/209.3

(Continued)

FOREIGN PATENT DOCUMENTS

CN 101360619 A 2/2009
CN 101890882 A 11/2010

(Continued)

OTHER PUBLICATIONS

Jun. 16, 2020, International Preliminary Report on Patentability issued in the International Patent Application No. PCT/JP2018/045347.

(Continued)

*Primary Examiner* — Yung-Sheng M Tsui
(74) *Attorney, Agent, or Firm* — Kenja IP Law PC

(57) ABSTRACT

Provided is a tire including, in a tread surface, a plurality of land portions partitioned by a circumferential main groove extending continuously in a tire circumferential direction, on at least one side in a tire width direction, and comprising, in an internal land portion located in a vehicle-installed inside half portion to a tire equatorial plane among the plurality of land portions, an internal resonator including a first auxiliary groove that terminates in the internal land portion, and a first branch groove that communicates between the first auxiliary groove and the circumferential main groove, and in the first branch groove, a hidden groove having an opening width in the tread surface that is smaller than a groove width of a groove bottom is provided adjacent to the first auxiliary groove.

7 Claims, 4 Drawing Sheets

(56) References Cited

U.S. PATENT DOCUMENTS

| | | |
|---|---|---|
| 2011/0017374 A1 | 1/2011 | Bervas et al. |
| 2013/0263984 A1 | 10/2013 | Bervas et al. |
| 2016/0075184 A1* | 3/2016 | Kato .................. B60C 11/0327 152/209.8 |
| 2016/0075185 A1 | 3/2016 | Akashi |
| 2017/0008347 A1 | 1/2017 | Akashi |
| 2017/0203614 A1 | 7/2017 | Kato |

FOREIGN PATENT DOCUMENTS

| | | |
|---|---|---|
| CN | 104890451 A | 9/2015 |
| CN | 105283326 A | 1/2016 |
| CN | 106132728 A | 11/2016 |
| EP | 0625436 A1 | 11/1994 |
| JP | 2007269144 A | 10/2007 |
| JP | 2010280266 A | 12/2010 |
| JP | 2011509213 A | 3/2011 |
| JP | 2013086683 A | 5/2013 |
| JP | 2013126842 A | 6/2013 |
| JP | 2013539735 A | 10/2013 |
| JP | 5507735 B1 | 5/2014 |
| JP | 2015171835 A | 10/2015 |
| JP | 2015214303 A | 12/2015 |
| JP | 2017185889 A | 10/2017 |

OTHER PUBLICATIONS

Sep. 22, 2021, search result of Office Action issued by the China National Intellectual Property Administration in the corresponding Chinese Patent Application No. 201880080168.4.
Feb. 12, 2019, International Search Report issued in the International Patent Application No. PCT/JP2018/045347.
Jun. 14, 2021, search result of the Extended European Search Report issued by the European Patent Office in the corresponding European Patent Application No. 18889421.6.

\* cited by examiner

PNEUMATIC TIRE

TECHNICAL FIELD

The present disclosure relates to a pneumatic tire.

BACKGROUND

In a pneumatic tire, it is required to reduce noise during vehicle running and improve quietness. To meet the requirement, various tires have been suggested in which vehicle exterior noise such as air column resonance sound (often observed in a range from about 800 to 1200 Hz in a passenger vehicle) generated from a circumferential main groove provided in a tread surface of a tire is reduced by a resonator (a so-called Helmholtz resonator) comprising an air chamber portion and a narrowed neck portion (e.g., PTL 1).

CITATION LIST

Patent Literature

PTL 1: Japanese Patent Laid-Open No. 2015-171835

SUMMARY

Technical Problem

However, in general, a Helmholtz resonator is provided in a land portion of a tread, a rigidity distribution of the land portion tends to be nonuniform, and uneven wear easily occurs in the tread. Consequently, it is desired that the uneven wear of the tread is suppressed while reducing air column resonance sound.

To solve such a problem, an object of the present disclosure is to provide a tire in which uneven wear in a tread can be suppressed while reducing air column resonance sound.

Solution to Problem

A tire of the present disclosure is a tire including, in a tread surface, a plurality of land portions partitioned by a circumferential main groove extending continuously in a tire circumferential direction, on at least one side in a tire width direction, and comprising, in an internal land portion located in a vehicle-installed inside half portion to a tire equatorial plane among the plurality of land portions, an internal resonator including a first auxiliary groove that terminates in the internal land portion, and a first branch groove that communicates between the first auxiliary groove and the circumferential main groove, wherein in the first branch groove, a hidden groove having an opening width in the tread surface that is smaller than a groove width of a groove bottom is provided adjacent to the first auxiliary groove.

Here, in the present description, "the vehicle-installed inside half portion" and "a vehicle-installed outside half portion" refer to outside and inside half portions of a vehicle in the tire width direction to the tire equatorial plane, when the tire is installed in the vehicle.

Furthermore, in the present description, "the tread surface" means an outer circumferential surface over an entire circumference of the tire, which comes in contact with a road surface when the tire assembled to a rim and filled with a predetermined internal pressure is rolled in a state of being loaded with a maximum load, and "a tread ground contact edge" means an edge of the tread surface in the tire width direction.

Additionally, in the present description, "the opening width", "the groove width" or the like of each of various grooves refers to a width measured along a direction orthogonal to an extending direction of the groove in the following reference state. Furthermore, in the present description, "a groove depth" and "a volume" or the like of each groove refer to a depth and a volume that are also measured in the following reference state. Hereinafter, it is considered that dimensions or the like of respective elements of the grooves or the like are measured in the reference state, unless otherwise mentioned.

Furthermore, in the present description, "the reference state" indicates a state where the tire is assembled to the rim, filled with the internal pressure and unloaded.

Note that the above "rim" indicates an approved rim (a measuring rim in Standards Manual of ETRTO, and a design rim in Year Book of TRA) in an applicable size described or to be described in future in an industrial standard effective in a district where the tire is produced and used, for example, JATMA Year Book of JATMA (the Japan Automobile Tyre Manufacturers Association) in Japan, Standards Manual of ETRTO (The European Tyre and Rim Technical Organization) in Europe, Year Book of TRA (The Tire and Rim Association, Inc.) in the U.S. or the like (that is, the above "rim" also includes a size that can be included in the above industrial standard in future, in addition to the existing size. Examples of "the size to be described in future" include sizes described as "future developments" in 2013 edition of Standards Manual of ETRTO). However, it is considered that a rim having a size that is not described in the above industrial standard is a rim having a width corresponding to a bead width of the tire. Furthermore, "a prescribed internal pressure" refers to an air pressure (a maximum air pressure) corresponding to a maximum load capability of a single wheel in an applicable size and ply rating described in Year Book of JATMA described above, or the like. "The prescribed internal pressure" having a size that is not described in the above industrial standard refers to an air pressure (the maximum air pressure) corresponding to the maximum load capability prescribed for each vehicle to which the tire is mounted. Additionally, "the maximum load" refers to a load corresponding to the above maximum load capability. Note that air described herein can be replaced with an inert gas such as a nitrogen gas, or the like.

Advantageous Effect

According to the present disclosure, uneven wear in a tread can be suppressed while reducing air column resonance sound.

DETAILED DESCRIPTION

Hereinafter, an embodiment of a tire according to the present disclosure will be illustrated and described with reference to the drawings.

Figure 1:
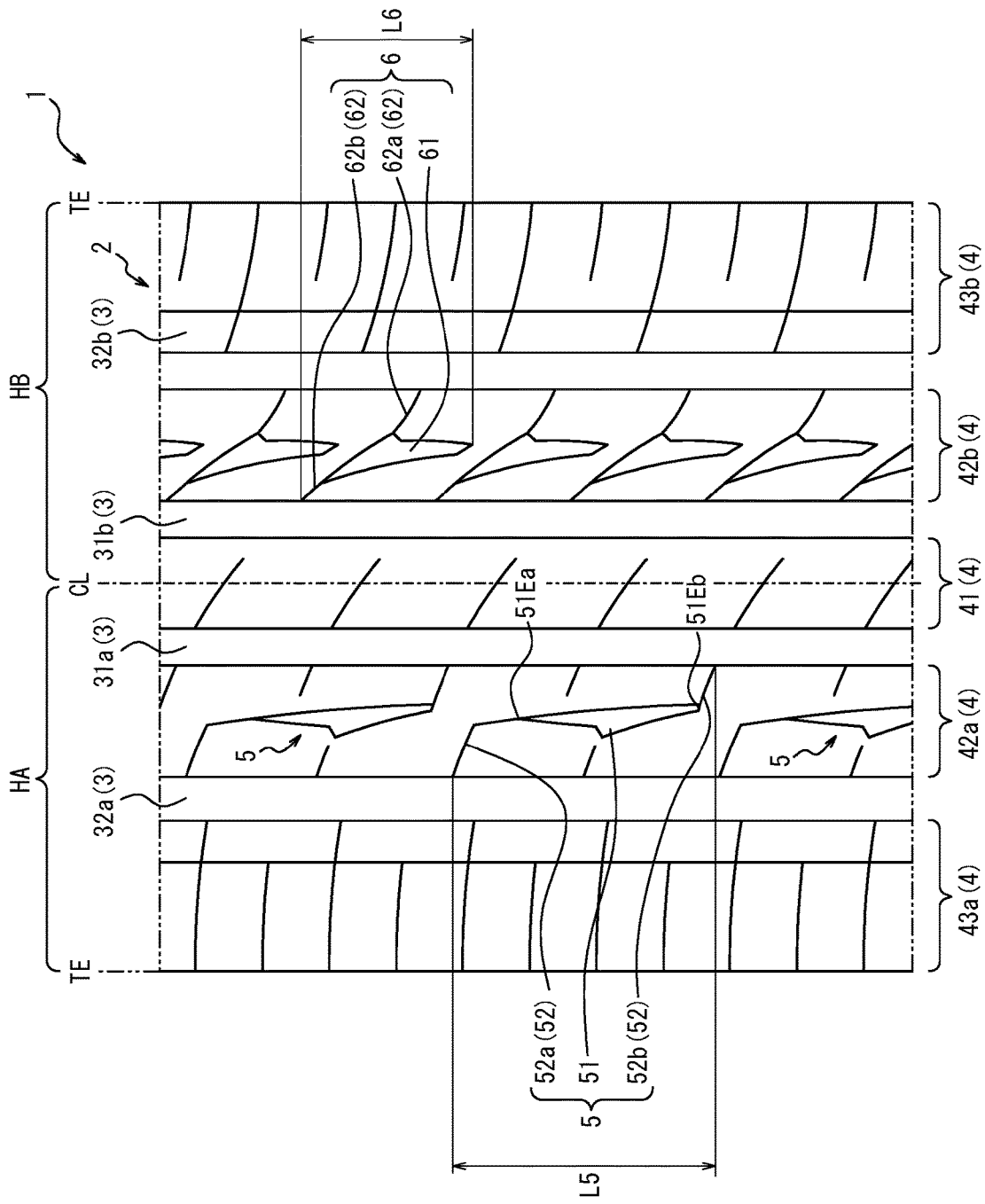
FIG. 1 is a partial developed view of a tread surface of a tire according to an embodiment of the present disclosure.

FIG. 1 is a partial developed view illustrating a tread surface 2 of a tire 1 according to an embodiment of the present disclosure. Although partially omitted from the drawing, the tire 1 of this embodiment comprises a carcass including a radial structure toroidally extending between bead portions, a belt disposed outside the carcass of a tread portion in a tire radial direction, and a tread rubber disposed outside the belt in the tire radial direction to form the tread surface 2.

As illustrated in FIG. 1, the tire 1 comprises, in the tread surface 2, two internal circumferential main grooves 31a, 32a extending in a vehicle-installed inside half portion HA (in FIG. 1, a paper surface left side) to a tire equatorial plane CL, and two external circumferential main grooves 31b, 32b extending in a vehicle-installed outside half portion HB (in FIG. 1, a paper surface right side) to the tire equatorial plane CL. The internal circumferential main grooves 31a, 32a and the external circumferential main grooves 31b, 32b linearly extend continuously in a tire circumferential direction. Furthermore, groove widths of the external circumferential main grooves 31b, 32b are equal to each other, and a total of the groove widths of the external circumferential main grooves 31b, 32b is smaller than a total of groove widths of the internal circumferential main grooves 31a, 32a. Furthermore, the groove widths of the internal circumferential main grooves 31a, 32a are different from each other, and the groove width of the internal circumferential main groove 32a on a tire ground contact edge TE side is larger than the groove width of the internal circumferential main groove 31a on a tire equatorial plane CL side, and is maximum among circumferential main grooves 3.

Note that in the tire 1, the circumferential main grooves 3 have an extending form as described above, and the groove widths of the circumferential main grooves 3 have a magnitude relation as described above. Alternatively, in the tire of the present disclosure, the circumferential main grooves 3 may have a zigzag-shaped or wavy-shaped extending form. Furthermore, for example, the groove widths of the external circumferential main grooves 31b, 32b may be different from each other, and the groove widths of the internal circumferential main grooves 31a, 32a may be equal to each other.

Furthermore, the tire includes, in the tread surface 2, a plurality of (in the present embodiment, five) land portions 4 partitioned by the (in the present embodiment, four) circumferential main grooves 3 continuously extending in the tire circumferential direction on at least one side in a tire width direction, as illustrated in FIG. 1.

More specifically, the tire comprises a central land portion 41 partitioned by the internal circumferential main groove 31a and the external circumferential main groove 31b adjacent to each other via the tire equatorial plane CL, an internal intermediate land portion 42a partitioned by two internal circumferential main grooves 31a, 32a, an external intermediate land portion 42b partitioned by two external circumferential main grooves 31b, 32b, an internal shoulder land portion 43a partitioned by a vehicle-installed inside tread ground contact edge TE (hereinafter, also referred to simply as "the tread ground contact edge TE") and the internal circumferential main groove 32a on the tread ground contact edge TE side, and an external shoulder land portion 43b partitioned by a vehicle-installed outside tread ground contact edge TE (hereinafter, also referred to simply as "the tread ground contact edge TE") and the external circumferential main groove 32b on the tread ground contact edge TE side. That is, the tire 1 includes, in the tread surface 2, the central land portion 41 including the tire equatorial plane CL, two internal land portions (the internal intermediate land portion 42a and the internal shoulder land portion 43a) located in the vehicle-installed inside half portion HA, and two external land portions (the external intermediate land portion 42b and the external shoulder land portion 43b) located in the vehicle-installed outside half portion HB.

Note that in the tire 1, each of the plurality of land portions 4 is a rib-like land portion extending continuously in the tire circumferential direction, but in the tire of the present disclosure, one or more of the plurality of land portions 4 may be a block-shaped land portion or the like.

Here, the tire 1 comprises an internal resonator 5 (in an illustrated example, a Helmholtz resonator) in the internal land portion (in the present embodiment, the internal intermediate land portion 42a) located in the vehicle-installed inside half portion HA to the tire equatorial plane CL among the above plurality of land portions 4.

More specifically, the internal resonator 5 includes a first auxiliary groove 51 that terminates in the internal intermediate land portion 42a, and a first branch groove 52 that communicates between the first auxiliary groove 51 and the circumferential main groove 3 (in the present embodiment, a first branch groove 52a that communicates between the first auxiliary groove 51 and the internal circumferential main groove 32a on the tread ground contact edge TE side, and a first branch groove 52b that communicates between the first auxiliary groove 51 and the internal circumferential main groove 31a on the tire equatorial plane CL side).

In the internal resonator 5, the first branch groove 52a is provided adjacent to an end portion 51Ea of the first auxiliary groove 51 (in FIG. 1, a paper surface upper side) on one side in the tire circumferential direction, and the first branch groove 52b is provided adjacent to an end portion 51Eb of the first auxiliary groove 51 on the other side (in FIG. 1, a paper surface lower side) in the tire circumferential direction. That is, in this example, one end of the first branch groove 52a is opened in the internal circumferential main groove 32a on the tread ground contact edge TE side, and the other end of the first branch groove 52a is opened in the end portion 51Ea of the first auxiliary groove 51 on one side in the tire circumferential direction. Furthermore, similarly, one end of the first branch groove 52b is opened in the internal circumferential main groove 31a on the tire equatorial plane CL side, and the other end of the first branch groove 52b is opened in the end portion 51Eb of the first auxiliary groove 51 on the other side in the tire circumferential direction.

In this way, the internal resonator 5 includes two first branch grooves 52a, 52b, and accordingly the first auxiliary groove 51 communicates with two internal circumferential main grooves 31a, 32a. Alternatively, the tire of the present disclosure may include a configuration where the internal resonator only includes one first branch groove, or a configuration where the internal resonator includes two first branch grooves and two branch grooves communicate with one internal circumferential main groove. Alternatively, the tire of the present disclosure may include a configuration where the internal resonator includes three, four or more first branch grooves.

Furthermore, in the tire of the present disclosure, the first branch grooves 52a, 52b may be provided in a portion other than the end portions 51Ea, 51Eb of the first auxiliary groove 51 in the tire circumferential direction, for example, a portion adjacent to a central portion of the first auxiliary groove 51 in the tire circumferential direction.

Note that in the internal resonator 5, a groove volume of the first auxiliary groove 51 is larger than a groove volume of one of two first branch grooves 52a, 52b connected to the first auxiliary groove 51. Furthermore, an opening area of the first auxiliary groove 51 to the tread surface 2 is larger than an opening area of one of two first branch grooves 52a, 52b to the tread surface 2, the first branch grooves being connected to the first auxiliary groove 51.

Figure 2:
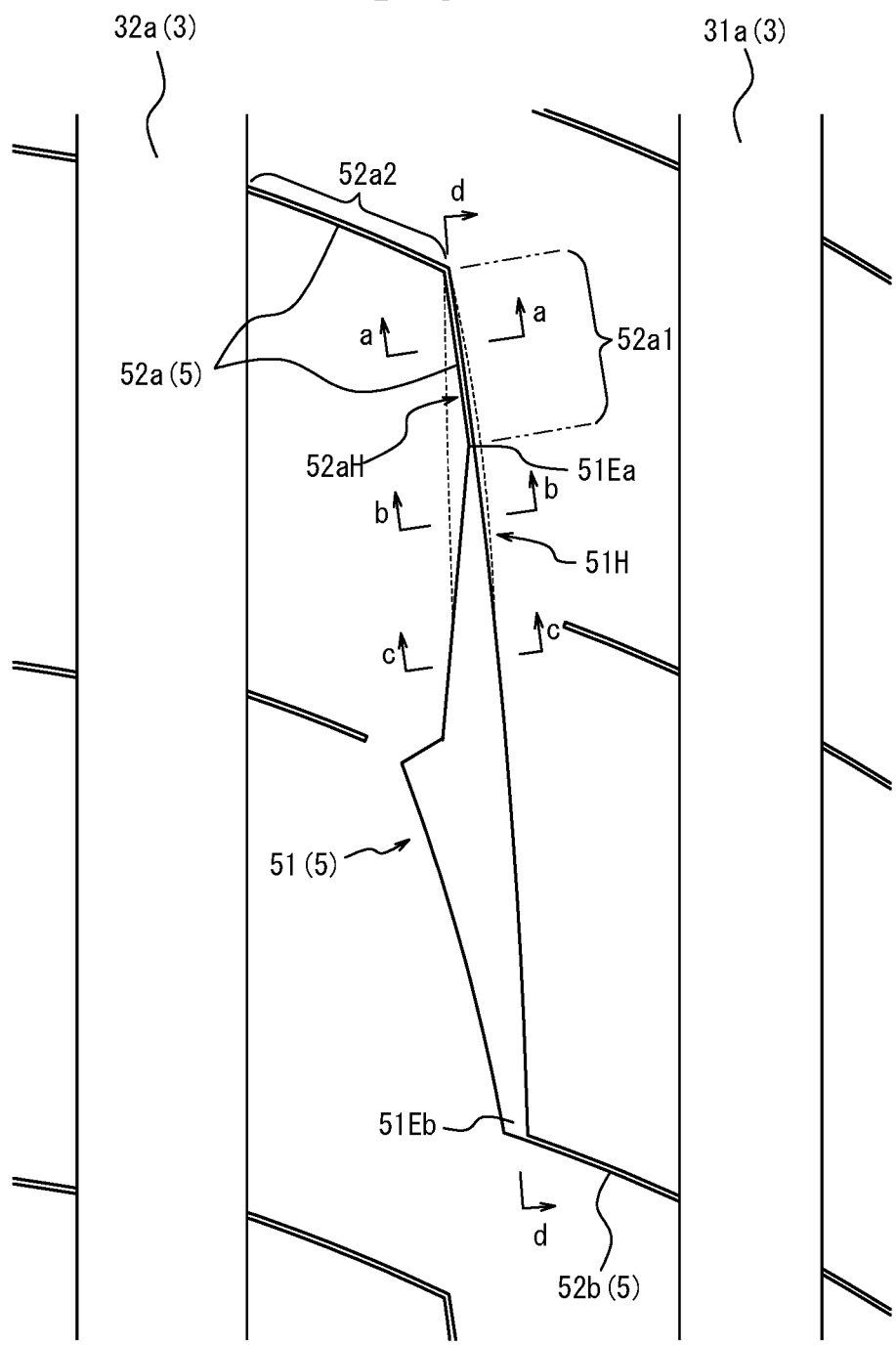
FIG. 2 is a partial enlarged view of the tread surface illustrated in FIG. 1.

FIG. 2 is a partial enlarged view of the tread surface 2 illustrated in FIG. 1, and illustrates the resonator 5 and a peripheral part of the resonator 5 in an enlarged manner. In the resonator 5, a hidden groove 52aH having an opening width in the tread surface 2 that is smaller than a groove width of a groove bottom is provided adjacent to the first auxiliary groove 51, in the first branch groove 52 (in the present embodiment, one first branch groove 52a). FIG. 2 illustrates a groove wall of the hidden groove 52aH with a broken line.

More specifically, in the internal resonator 5, the first branch groove 52a includes one bent portion while extending, and comprises a first extending portion 52a1 extending approximately along an extending direction of the first auxiliary groove 51, and a second extending portion 52a2 extending in an extending direction different from that of the first extending portion. The first extending portion 52a1 is connected to the first auxiliary groove 51, and the second extending portion 52a2 is connected to the internal circumferential main groove 32a. In the internal resonator 5, the hidden groove 52aH is provided only in the first extending portion 52a1. Furthermore, the hidden groove 52aH is provided over an extending length of the first extending portion 52a1.

Note that the first branch groove 52a in the present embodiment includes one bent portion while extending. Alternatively, in the tire of the present disclosure, the first branch groove 52a may be formed to extend (in a linear or arched manner) without including the bent portion, formed to include two or more bent portions while extending, or formed otherwise.

Furthermore, in the tire 1, as illustrated in FIG. 2, the hidden groove 52aH provided in the first extending portion 52a1 of the first branch groove 52a is provided continuously with an end portion region of the first auxiliary groove 51. That is, a hidden groove 51H is also provided in a peripheral region of the end portion 51Ea of the first auxiliary groove 51 on one side in the tire circumferential direction. Alternatively, in the tire of the present disclosure, the hidden groove may include a configuration where the hidden groove is provided in an entire region of the first auxiliary groove 51 or only in the first branch groove 52a.

Note that in the internal resonator 5, a portion in which an opening width in the tread surface 2 is constant is the first branch groove 52a. In the tire of the present disclosure, in the case where an opening width of the first branch groove changes along an extending direction of the first branch groove, it is considered that a portion having an opening width that is less than 20% of a maximum width of the first auxiliary groove is the first branch groove.

Figure 3:
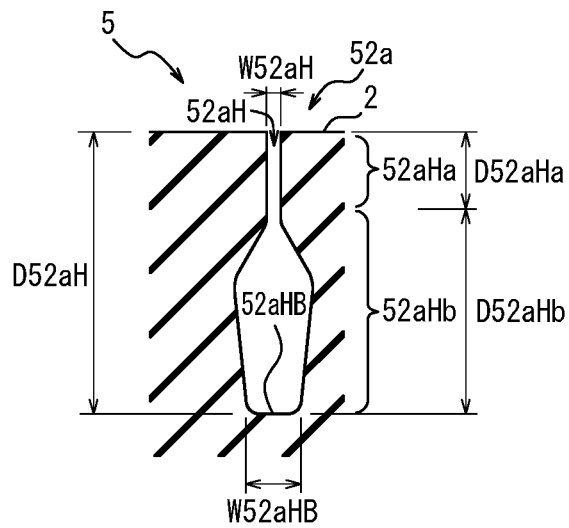
FIG. 3 is a cross-sectional view along the a-a line illustrated in FIG. 2.
Figure 4:
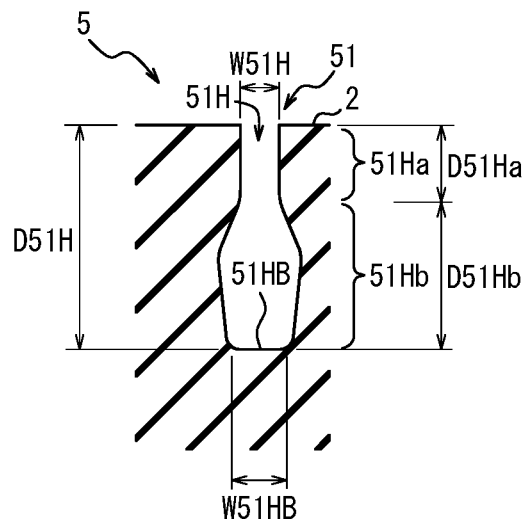
FIG. 4 is a cross-sectional view along the b-b line illustrated in FIG. 2.
Figure 5:
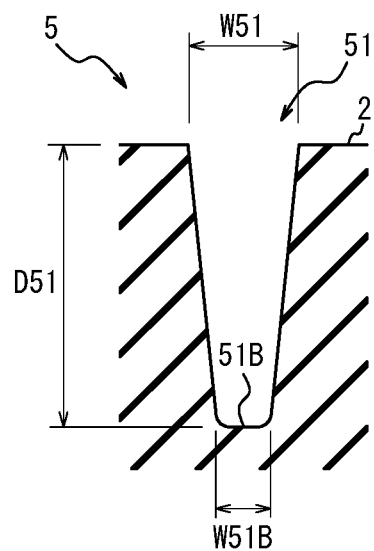
FIG. 5 is a cross-sectional view along the c-c line illustrated in FIG. 2.

FIGS. 3 to 5 are cross-sectional views of the internal resonator 5. That is, FIG. 3 is a cross-sectional view along the a-a line of FIG. 2, FIG. 4 is a cross-sectional view along the b-b line of FIG. 2, and FIG. 5 is a cross-sectional view along the c-c line of FIG. 2. More specifically, FIG. 3 is a cross-sectional view of a surface of the first branch groove 52a that is orthogonal to the extending direction of the first branch groove 52a, and FIGS. 4, 5 are cross-sectional views illustrating a surface of the first auxiliary groove 51 that is orthogonal to the extending direction of the first auxiliary groove 51.

As illustrated in FIG. 3, in the hidden groove 52aH of the first branch groove 52a, an opening width W52aH in the tread surface 2 is smaller than a groove depth D52aH, and smaller than a groove width W52aHB in a groove bottom 52aHB.

Furthermore, as illustrated in FIG. 4, in an end portion region including the hidden groove 51H of the first auxiliary groove 51, an opening width W51H in the tread surface 2 is smaller than a groove depth D51H, and smaller than a groove width W51HB in a groove bottom 51HB.

Additionally, as illustrated in FIG. 5, in a portion other than the end portion region including the hidden groove 51H of the first auxiliary groove 51, an opening width W51 in the tread surface 2 is smaller than a groove depth D51, and larger than or equal to a groove width W51B in a groove bottom 51B.

Furthermore, in the end portion region including the hidden groove 51H of the first auxiliary groove 51, the opening width W51H in the tread surface 2 is smaller than the opening width W51 of the first auxiliary groove 51 in the tread surface 2 of the portion other than the end portion region. Additionally, the groove depth D51H of the end portion region of the first auxiliary groove 51 including the hidden groove 51H is larger than the groove depth D51 of the first auxiliary groove 51 in the portion other than the end portion region.

Note that in the tire 1, a groove depth of the first branch groove 52a is maximum in the hidden groove 52aH. Alternatively, in the tire of the present disclosure, the groove depth of the first branch groove 52a may be constant.

Furthermore, the hidden groove 52aH in the first branch groove 52a comprises an opening side portion 52aHa having a groove width maintained on an inner side in the tire radial direction (a groove width direction) in the same manner as in the opening width W52aH in the tread surface 2, and a groove bottom side portion 52aHb having a groove width that is larger than the opening width W52aH and continuous in the groove depth direction, in order from a tread surface 2 side in cross-sectional view of the surface of the first branch groove 52a that is orthogonal to the extending direction of the first branch groove as illustrated in FIG. 3.

In the hidden groove 52aH of the first branch groove 52a, the opening side portion 52aHa has a constant groove width, while the groove width of the groove bottom side portion 52aHb of the hidden groove 52aH gradually increases to a vicinity of a middle of the groove bottom side portion 52aHb in a region from the tread surface 2 side toward a groove bottom 52aHB side, and then gradually decreases or is maintained constant in a region from the vicinity of the middle of the groove bottom side portion 52aHb to the groove bottom 52aHB. That is, the groove bottom side portion 52aHb in this example has a deformed hexagonal shape in cross-sectional view of the surface that is orthogonal to the extending direction of the first branch groove 52a.

Alternatively, in the internal resonator of the present disclosure, the groove bottom side portion 52aHb of the hidden groove 52aH provided in the first branch groove 52a may have, in cross-sectional view, a shape (e.g., a circular, elliptic or rhombic shape) in which the groove width gradually increases and gradually decreases from the tread surface 2 side toward a groove bottom 52aHB side, a shape (e.g., a quadrangular shape) in which the groove width is constant from the tread surface 2 side toward the groove bottom 52aHB side, a shape (e.g., a triangular or semicircular shape) in which the groove width always gradually increases from the tread surface 2 toward the groove bottom 52aHB side, or the like.

Furthermore, the internal resonator of the present disclosure may include a configuration where the hidden groove 52aH provided in the first branch groove 52a does not include the opening side portion 52aHa. That is, the hidden groove 52aH may have a configuration where the groove width gradually increases from the tread surface 2 side toward the groove bottom 52aHB side, and the opening width W52aH in the tread surface 2 is smaller than the groove width W52aHB on the groove bottom 52aHB side.

Figure 6:
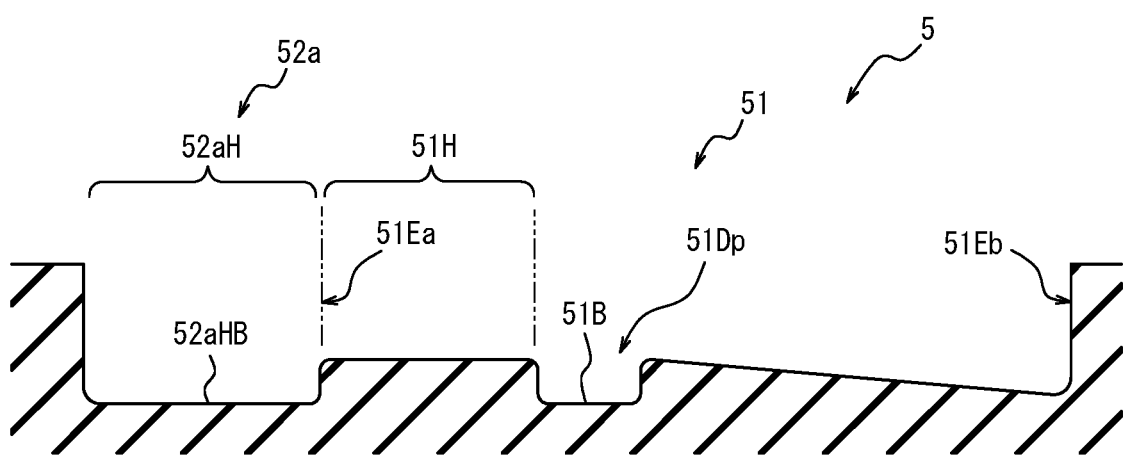
FIG. 6 is a cross-sectional view along the d-d line illustrated in FIG. 2.

Additionally, FIG. 6 is a cross-sectional view along the d-d line of FIG. 2, and here illustrates a developed cross section along opening centers of the first auxiliary groove 51 and the first branch groove 52a. In the first auxiliary groove 51 of the internal resonator 5, the groove depth gradually decreases from a first branch groove 52b side (a paper surface right side) toward a first branch groove 52a side (a paper surface left side), and the first auxiliary groove 51 includes a groove deepest portion 51Dp in which a groove depth of the first auxiliary groove 51 is maximum, in at least a central portion of the first auxiliary groove 51 in the extending direction.

Furthermore, in the first auxiliary groove 51, the groove depth of the first auxiliary groove 51 is minimum in a portion adjacent to the first branch groove 52a. That is, in the first auxiliary groove 51, the groove depth is minimum between the groove deepest portion 51Dp disposed in at least the central portion of the first auxiliary groove 51 in the extending direction and the first branch groove 51a connected to the first auxiliary groove 51, in developed view of the cross section along the extending direction of the first auxiliary groove 51. According to this configuration, uneven wear in a tread can be more reliably suppressed while more effectively reducing air column resonance sound.

Note that in the internal resonator 5, the first auxiliary groove 51 locally deepens in the groove deepest portion 51Dp. Alternatively, the tire of the present disclosure may include a configuration where the groove depth of the first auxiliary groove gradually increases from the end portion of the first auxiliary groove on one side in the tire circumferential direction and the end portion thereof on the other side toward the central portion of the first auxiliary groove in the extending direction. In this case, it is considered that a portion having a groove depth in excess of twice an average depth of the first auxiliary groove 51 is the groove deepest portion 51Dp.

Furthermore, the tire 1 comprises an external resonator 6 (in an illustrated example, a Helmholtz resonator) in an external land portion (in the present embodiment, the external intermediate land portion 42b) located in the vehicle-installed outside half portion HB to the tire equatorial plane CL, among the plurality of land portions 4. The external resonator 6 includes a second auxiliary groove 61 that terminates in the external intermediate land portion 42b, and a second branch groove 62 that communicates between the second auxiliary groove 61 and the circumferential main groove 3 (in the present embodiment, a second branch groove 62a that communicates between the second auxiliary groove 61 and the vehicle-installed outside circumferential main groove 32b, and a second branch groove 62b that communicates between the second auxiliary groove 61 and the circumferential main groove 31b on the tire equatorial plane CL side).

In the external resonator 6, the second branch groove 62a is provided adjacent to a central portion of the second auxiliary groove 61 in the tire circumferential direction, and the second branch groove 62b is provided adjacent to an end portion of the second auxiliary groove 61 on one side (in FIG. 1, a paper surface upper side) in the tire circumferential direction. That is, in this example, one end of the second branch groove 62a is opened in the external circumferential main groove 32b on the tread ground contact edge TE side, and the other end of the second branch groove 62a is opened in the central portion of the second auxiliary groove 61 in the tire circumferential direction. Furthermore, similarly, one end of the second branch groove 62b is opened in the external circumferential main groove 31b on the tire equatorial plane CL side, and the other end of the second branch groove 62b is opened in the end portion of the second auxiliary groove 61 on one side in the tire circumferential direction.

Thus, the external resonator 6 includes two second branch grooves 62a, 62b, and the second auxiliary groove 61 accordingly communicates with two external circumferential main grooves 31b, 32b. Alternatively, the tire of the present disclosure may include a configuration where the external resonator only includes one second branch groove, or a configuration where the external resonator includes two second branch grooves and two branch grooves communicate with one external circumferential main groove. Furthermore, the tire of the present disclosure may include a configuration where the external resonator includes three, four or more second branch grooves.

Alternatively, in the tire of the present disclosure, both of the second branch grooves 62a, 62b may be provided adjacent to the end portion of the second auxiliary groove 61 in the tire circumferential direction, and both of the second branch grooves 62a, 62b may be provided adjacent to the central portion of the second auxiliary groove 61 in the tire circumferential direction.

Note that in the external resonator 6, a groove volume of the second auxiliary groove 61 is larger than a groove volume of one of two second branch grooves 62a, 62b connected to the second auxiliary groove 61. Furthermore, an opening area of the second auxiliary groove 61 to the tread surface 2 is larger than an opening area of one of two second branch grooves 62a, 62b connected to the second auxiliary groove 61, to the tread surface 2.

Furthermore, in the external resonator 6, either of the second branch grooves 62a, 62b is not provided with a hidden groove in which an opening width in the tread surface 2 is smaller than a groove width of a groove bottom. Alternatively, in the tire of the present disclosure, at least one of the second branch grooves 62a, 62b may be provided with the hidden groove in the same manner as in the internal resonator 5.

Here, according to the tire 1, in the tread surface 2, a length L6 of the external resonator 6 in the tire circumferential direction is smaller than a length L5 of the internal resonator 5 in the tire circumferential direction.

Furthermore, according to the tire 1, in the internal intermediate land portion 42a, a plurality of internal resonators 5 described above are arranged via a constant space in the tire circumferential direction, and in the external intermediate land portion 42b, a plurality of external resonators 6 described above are arranged via a constant space in the tire circumferential direction.

Here, in the tire 1, a volume of the second auxiliary groove 61 of the external resonator 6 is smaller than a volume of the first auxiliary groove 51 of the internal resonator 5, and a number of the external resonators 6 to be arranged in the tire circumferential direction is larger than a number of the internal resonators 5 to be arranged in the tire circumferential direction.

That is, in the tire 1, an arrangement pitch of the external resonators 6 in the tire circumferential direction is smaller than an arrangement pitch of the internal resonators 5 to be arranged in the tire circumferential direction. Note that in the case where the internal resonators 5 and the external resonators 6 do not have the constant pitch in the tire circumferential direction and are arranged while changing the space in the tire circumferential direction, it is considered that an average pitch in the tire circumferential direction is the arrangement pitch of the internal resonators 5 and the external resonators 6.

Furthermore, in the tire 1, the internal resonators 5 adjacent in the tire circumferential direction are not in mutually overlapping positions in the tire circumferential direction, but the external resonators 6 adjacent in the tire circumferential direction are in the mutually overlapping positions in the tire circumferential direction.

Additionally, in the tire 1, the hidden groove 52aH of the first branch groove 52a of the internal resonator 5 overlaps with the second auxiliary groove 61 of the external resonator 6 in the tire width direction. More specifically, in the illustrated example, an entire extending region of the hidden groove 52aH of the first branch groove 52a of the internal resonator 5 in the tire circumferential direction overlaps with an extending region of the first auxiliary groove 62 of the external resonator 6 in the tire circumferential direction, in the tire width direction. Especially in the tire 1, the hidden groove 52aH of the first branch groove 52a of the internal resonator 5 overlaps with a maximum width position of the second auxiliary groove 61 of the external resonator 6 in the tire circumferential direction.

Subsequently, operations and effects by the tire 1 according to the present embodiment will be described.

As described above, the tire 1 comprises the internal resonator 5 including the first auxiliary groove 51 that terminates in the internal intermediate land portion 42a, and the first branch groove 52 (in the present embodiment, the first branch grooves 52a, 52b) that communicates between the first auxiliary groove 51 and the circumferential main groove 3 (in the present embodiment, the internal circumferential main grooves 31a, 32a), in the internal land portion (in the present embodiment, the internal intermediate land portion 42a) located in the vehicle-installed inside half portion HA to the tire equatorial plane CL, among the plurality of land portions 4 provided in the tread surface 2. Consequently, air column resonance sound generated in the internal circumferential main grooves 31a, 32a can be reduced by the internal resonator 5.

Furthermore, according to the tire 1, in the first branch groove 52 (in the present embodiment, the first branch groove 52a), the hidden groove 52aH having the opening width in the tread surface 2 that is smaller than the groove width of the groove bottom is provided adjacent to the first auxiliary groove 51. In the hidden groove 52aH, the opening width W52aH in the tread surface 2 is smaller than the groove width W52aHB of the groove bottom 52aHB. Consequently, excessive decrease in rigidity of the land portion due to the internal resonator 5 provided in the tread surface 2 can be suppressed, and hence the uneven wear in the tread can be suppressed.

Additionally, in the tire 1, the hidden groove 52aH comprises the opening side portion 52aHa having the groove width maintained on the inner side in the tire radial direction (the groove depth direction) in the same manner as in the opening width W52aH in the tread surface 2. Consequently, the uneven wear in the tread around the internal resonator 5 can be more reliably inhibited.

In addition, the tire 1 comprises the external resonator 6 including, in the external land portion (in the present embodiment, the external intermediate land portion 42b) located in the vehicle-installed outside half portion HB to the tire equatorial plane CL among the plurality of land portions 4, the second auxiliary groove 61 that terminates in the external land portion 42b, and the second branch groove 62 (in the present embodiment, the second branch grooves 62a, 62b) that communicates between the second auxiliary groove 61 and the circumferential main groove 3 (in the present embodiment, the external circumferential main grooves 31b, 32b). Consequently, the air column resonance sound generated in the external circumferential main grooves 31b, 32b can be reduced by the external resonator 6, and hence the air column resonance sound generated in the tire can be reduced more than in the case where the internal resonator 5 is only provided in the tread surface 2.

Furthermore, according to the tire 1, in the tread surface 2, the length L6 of the external resonator 6 in the tire circumferential direction is smaller than the length L5 of the internal resonator 5 in the tire circumferential direction. In general, a ground contact length of the tread in the vehicle-installed inside half portion HA is longer than that in the vehicle-installed outside half portion HB. Thus, the length L6 of the external resonator 6 in the tire circumferential direction is smaller than the length L5 of the internal resonator 5 in the tire circumferential direction, and then the number of the external resonators 6 to be included in a contact patch increases. Consequently, the air column resonance sound can be further reduced.

Additionally, in the tire 1, the volume of the second auxiliary groove 61 of the external resonator 6 is smaller than the volume of the first auxiliary groove 51 of the internal resonator 5, and the number of the external resonators 6 to be arranged in the tire circumferential direction is larger than the number of the internal resonators 5 to be arranged in the tire circumferential direction. Thus, the number of the external resonators 6 to be arranged in the tire circumferential direction is larger than the number of the internal resonators 5 to be arranged in the tire circumferential direction, and then the number of the external resonators 6 to be included in the contact patch increases, which is advantageous for further reduction of the air column resonance sound. However, as the number of the external resonators 6 to be arranged increases, rigidity of the external intermediate land portion 42b provided with the external resonator 6 decreases. To solve the problem, the volume of the second auxiliary groove 61 of the external resonator 6 is smaller than the volume of the first auxiliary groove 51 of the internal resonator 5, and then a uniform rigidity distribution in the tread can be achieved. Consequently, the uneven wear in the tread can be suppressed.

Furthermore, the tire 1 comprises at least two circumferential main grooves 3, and the groove width of the circumferential main groove on a vehicle-installed innermost side (in the present embodiment, the internal circumferential groove 32a) is maximum among the circumferential main grooves 3. In this case, draining is efficiently performed through the internal circumferential main groove 32a provided on the vehicle-installed innermost side and having a maximum groove width, and hence, especially, a drainage performance during straight running can improve.

Additionally, in general, the circumferential main groove 3 in which the air column resonance sound is loud and which has a large groove width is disposed on the vehicle-installed innermost side, so that noise to outside can be minimized.

Furthermore, in the tire 1, the hidden groove 52aH of the first branch groove 52a of the internal resonator 5 overlaps with the second auxiliary groove 61 of the external resonator 6 in the tire width direction. In this case, the hidden groove 52aH in which high rigidity of the land portion can be maintained overlaps with the second auxiliary groove 61 in which the rigidity of the land portion is easy to decrease, in the tire width direction. Consequently, the rigidity distribution in the tread can be further uniform, and hence the uneven wear in the tread can be more reliably suppressed.

Especially, in the tire 1, the hidden groove 52aH of the first branch groove 52a of the internal resonator 5 overlaps with the maximum width position of the second auxiliary groove 61 of the external resonator 6 in the tire circumferential direction, which is advantageous especially in effectively achieving the uniform rigidity distribution in the tire width direction.

Furthermore, in the tire 1, the opening width of each of the first auxiliary groove 51 and the second auxiliary groove 61 in the tread surface 2 gradually increases from one end of each of the first auxiliary groove 51 and the second auxiliary groove 61 in the tire circumferential direction toward the maximum width position of each of the first auxiliary groove 51 and the second auxiliary groove 61, and gradually decreases from the maximum width position toward the other end of each of the first auxiliary groove 51 and the second auxiliary groove 61 in the tire circumferential direction. In this case, during rolling of the loaded tire, the groove width of the central portion of each of the first auxiliary groove 51 and the second auxiliary groove 61 in the tire circumferential direction easily changes, and water that enters the first auxiliary groove 51 and the second auxiliary groove 61 can be efficiently discharged. Consequently, the drainage performance can further improve.

Additionally, in the tire 1, the groove depth of the first branch groove 52a of the internal resonator 5 is maximum in the hidden groove 52aH. Consequently, quietness (reduction effect of the air column resonance sound) is compatible with uneven wear resistance.

Furthermore, the tire 1 includes the groove deepest portion 51Dp in which the groove depth D51 in the first auxiliary groove 51 is maximum, in at least the central portion of the first auxiliary groove 51 of the internal resonator 5 in the extending direction. If the groove deepest portion 51Dp is provided, the groove volume of the auxiliary groove 51 can be easily acquired, and hence the drainage performance can further improve.

Note that in the case where the groove deepest portion 51Dp is configured so that the depth of the first auxiliary groove 51 locally increases in the groove deepest portion 51Dp as in the tire 1 of the present embodiment, it is easy to maintain the rigidity of the land portion provided with the internal resonator 5 (in the present embodiment, the internal intermediate land portion 42a), and it is possible to more reliably suppress the uneven wear in the tread, as compared with a case where the groove deepest portion 51Dp is configured so that the depth of the first auxiliary groove 51 gradually decreases.

Here, in the vehicle-installed inside half portion HA, it is preferable that a ground contact width of the internal shoulder land portion 43a (a tire widthwise distance between contact ends of the contact patch when the tire is mounted to an applicable rim, filled with a prescribed internal pressure, and loaded with a maximum load) is smaller than a ground contact width of the internal intermediate land portion 42a.

Furthermore, in the vehicle-installed outside half portion HB, it is preferable that a ground contact width of the external shoulder land portion 43b is smaller than a ground contact width of the external intermediate land portion 42b.

Additionally, in the case where the central land portion 41 is formed as in the embodiment illustrated in FIG. 1, it is preferable that a ground contact width of the central land portion 41 among the plurality of land portions is minimum.

In the present disclosure, it is preferable that the groove width of the internal circumferential main groove 32a located on an outermost side in the tire width direction is maximum among the plurality of circumferential main grooves. This is because it is easy to increase a ground contact length on a vehicle-installed inner side during running, and such easiness noticeably contributes to a hydroplaning performance and can therefore effectively improve the hydroplaning performance.

In the present disclosure, for an edge length per unit area in the tire width direction, it is preferable that an edge length per unit area of the external shoulder land portion 43b in the tire width direction is larger than an edge length per unit area of the internal shoulder land portion 43a in the tire width direction.

Furthermore, for the edge length per unit area in the tire width direction, it is preferable that an edge length per unit area of the external intermediate land portion 42b in the tire width direction is larger than an edge length per unit area of the internal intermediate land portion 42a in the tire width direction.

Additionally, for an edge length per unit area in the tire circumferential direction, it is preferable that an edge length per unit area of the internal shoulder land portion 43a in the tire circumferential direction is larger than an edge length per unit area of the external shoulder land portion 43b in the tire circumferential direction.

This is because the ground contact length can be optimized, the performance of the resonator can be more effectively exhibited, and the quietness can be further improved.

EXAMPLES

Hereinafter, examples of the present disclosure will be described, but the present disclosure is not limited to the following examples.

Example Tire and Comparative Example Tire (both had a tire size of 215/55R17) are experimentally produced under specifications illustrated in Table 1, and reduction effect of air column resonance sound (quietness) and uneven wear resistance are evaluated.

Example Tire 1 has a tread pattern illustrated in FIG. 1, comprises an internal resonator illustrated in FIGS. 1 to 5 in an internal intermediate land portion, and comprises an external resonator illustrated in FIG. 1 in an external intermediate land portion. In a second branch groove 52a of the internal resonator, a hidden groove 52aH is provided adjacent to a first auxiliary groove 51.

Comparative Example Tire 1 is a tire similar to Example Tire 1 except that the comparative example tire does not comprise any resonators in a land portion.

Comparative Example Tire 2 is a tire similar to Example Tire 1 except that in a second branch groove of an internal resonator, any hidden grooves are not provided.

Example Tire 2 is a tire similar to Example Tire 1 except that a length of an external resonator in a tire circumferential direction is equal to a length of an internal resonator in the tire circumferential direction.

Example Tire 3 is a tire similar to Example Tire 1 except that a length of an external resonator in a tire circumferential direction is larger than a length of an internal resonator in the tire circumferential direction.

Example Tire 4 is a tire similar to Example Tire 1 except that a groove volume of an external resonator is larger than a groove volume of an internal resonator.

Example Tire 5 is a tire similar to Example Tire 1 except that a number of external resonators to be arranged in a tire circumferential direction is smaller than a number of internal resonators to be arranged in the tire circumferential direction.

Example Tire 6 is a tire similar to Example Tire 1 except that a groove volume of an external resonator is larger than a groove volume of an internal resonator and except that a number of external resonators to be arranged in a tire circumferential direction is smaller than a number of internal resonators to be arranged in the tire circumferential direction.

Example Tire 7 is a tire similar to Example Tire 1 except that a groove width of a vehicle-installed innermost circumferential main groove is not maximum among circumferential main grooves and except that a groove width of a vehicle-installed outermost circumferential main groove is maximum among the circumferential main grooves.

Example Tire 8 is a tire similar to Example Tire 1 except that a hidden groove of a first branch groove in an internal resonator does not overlap with a second auxiliary groove in an external resonator in a tire width direction.

(Reduction Effect of Air Column Resonance Sound)

Each sample tire is assembled to a rim (7.5 J) to form a tire wheel. When the tire is applied with an air pressure of 230 kPa (an equivalent pressure) and a tire load of 4.46 kN and is run at a speed of 80 km/h on an indoor drum test machine, tire side sound is measured on conditions determined in accordance with JASO C606 standards. Then, a partial overall value in a ⅓ octave center frequency 800-1000-1250 Hz band is computed, and air column resonance sound is calculated. Table 1 illustrates the results with a reduction amount (%) of the air column resonance sound to Comparative Example Tire 1. A larger percentage indicates a larger reduction amount of the air column resonance sound.

(Uneven Wear Resistance)

Each sample tire is assembled to a rim (7.5 J) to form a tire wheel, and the tire is applied with an air pressure of 230 kPa (an equivalent pressure) and a tire load of 4.46 kN, and is run as much as 10000 km at a speed of 80 km/h on an indoor drum test machine. Afterward, a worn state of a tread surface is visually confirmed. Table 1 illustrates the results. An uneven wear resistance of Comparative Example Tire 1 evaluated by an uneven wear amount is regarded as 10, and evaluation in ten stages is performed. A larger numeric value indicates more excellency in uneven wear resistance.

(Drainage Performance)

Each sample tire is assembled to a rim (7.5 J) to form a wheel, and the tire was filled with an air pressure of 230 kPa (an equivalent pressure) and installed in a passenger vehicle. Afterward, the vehicle accelerates from a slow state in an evaluation course where water is sprayed over a paved road surface until a water depth reached 7 mm, and a vehicle speed when a slip rate of the tire reached 10% (a speed when the tire span on water) is obtained, to evaluate a drainage performance (a hydroplaning performance). Table 1 illustrates the results. The drainage performance of Comparative Example Tire 1 by the above vehicle speed is regarded as 100, and drainage performances of the other tires are indexed and evaluated. A larger numeric value indicates more excellency in drainage performance.

TABLE 1

| | Presence of resonator | Presence of hidden groove | Relation between length L5 of internal resonator in tire circumferential direction and length L6 of external resonator in tire circumferential direction | Relation between groove volume V5 of first auxiliary groove and groove volume V6 of second auxiliary groove | Relation between number N5 of internal resonators to be arranged and number N6 of external resonators to be arranged | Groove width of circumferential main groove on vehicle-installed innermost side (mm) | Maximum groove width of circumferential main groove other than circumferential main groove on vehicle-installed innermost side (mm) | Positional relation between hidden groove of first branch groove and second auxiliary groove | Quietness (air column resonance sound reduction amount (dB)) | Reduction amount (%) | Uneven wear resistance (INDEX) | Drainage performance (INDEX) |
|---|---|---|---|---|---|---|---|---|---|---|---|---|
| Example Tire 1 | Present | Present | L5 > L6 | V5 > V6 | N5 < N6 | 9.5 | 8 | Overlap | 1.5 | −29% | 8 | 107 |
| Comparative Example Tire 1 | None | None | — | — | — | 9.5 | 8 | — | 0 | 0% | 10 | 100 |
| Comparative Example Tire 2 | Present | None | L5 > L6 | V5 > V6 | N5 < N6 | 9.5 | 8 | Overlap | 1.5 | −29% | 2 | 105 |

TABLE 1-continued

| | Presence of resonator | Presence of hidden groove | Relation between length L5 of internal resonator in tire circumferential direction and length L6 of external resonator in tire circumferential direction | Relation between groove volume V5 of first auxiliary groove and groove volume V6 of second auxiliary groove | Relation between number N5 of internal resonators to be arranged and number N6 of external resonators to be arranged | Groove width of circumferential main groove on vehicle-installed innermost side (mm) | Maximum groove width of circumferential main groove other than circumferential main groove on vehicle-installed innermost side (mm) | Positional relation between hidden groove of first branch groove and second auxiliary groove | Quietness (air column resonance sound reduction amount (dB)) | Reduction amount (%) | Uneven wear resistance (INDEX) | Drainage performance (INDEX) |
|---|---|---|---|---|---|---|---|---|---|---|---|---|
| Example Tire 2 | Present | Present | L5 = L6 | V5 > V6 | N5 < N6 | 9.5 | 8 | Overlap | 1.3 | −26% | 7 | 106 |
| Example Tire 3 | Present | Present | L5 < L6 | V5 > V6 | N5 < N6 | 9.5 | 8 | Overlap | 1.3 | −26% | 6 | 106 |
| Example Tire 4 | Present | Present | L5 > L6 | V5 < V6 | N5 < N6 | 9.5 | 8 | Overlap | 1.5 | −29% | 4 | 106 |
| Example Tire 5 | Present | Present | L5 > L6 | V5 > V6 | N5 > N6 | 9.5 | 8 | Overlap | 1.2 | −24% | 4 | 105 |
| Example Tire 6 | Present | Present | L5 > L6 | V5 < V6 | N5 > N6 | 9.5 | 8 | Overlap | 1.2 | −24% | 5 | 105 |
| Example Tire 7 | Present | Present | L5 > L6 | V5 > V6 | N5 < N6 | 8 | 9.5 | Overlap | 1.5 | −29% | 8 | 100 |
| Example Tire 8 | Present | Present | L5 > L6 | V5 > V6 | N5 < N6 | 9.5 | 8 | Non-overlap | 1.5 | −29% | 7 | 107 |

REFERENCE SIGNS LIST 1 tire
2 tread surface
3 circumferential main groove
31a, 32a internal circumferential main groove
31b, 32b external circumferential main grooves
4 land portion
41 central land portion
42a internal intermediate land portion
42b external intermediate land portion
43a internal shoulder land portion
43b external shoulder land portion
5 internal resonator
51 first auxiliary groove
52a, 52b first branch groove
6 external resonator
61 second auxiliary groove
62a, 62b second branch groove
CL tire equatorial plane
HA vehicle-installed inside half portion
HB vehicle-installed outside half portion
TE tread ground contact edge

The invention claimed is:

1. A tire including, in a tread surface, a plurality of land portions partitioned by a circumferential main groove extending continuously in a tire circumferential direction, on at least one side in a tire width direction, and comprising, in an internal land portion located in a vehicle-installed inside half portion to a tire equatorial plane among the plurality of land portions, an internal resonator including a first auxiliary groove that terminates in the internal land portion, and a first branch groove that communicates between the first auxiliary groove and the circumferential main groove, wherein in the first branch groove, a hidden groove having an opening width in the tread surface that is smaller than a groove width of a groove bottom is provided adjacent to the first auxiliary groove,
in an external land portion located in a vehicle-installed outside half portion to the tire equatorial plane among the plurality of land portions, an external resonator comprising a second auxiliary groove that terminates in the external land portion, and a second branch groove that communicates between the second auxiliary groove and the circumferential main groove, wherein in the tread surface, a length of the external resonator in the tire circumferential direction is smaller than a length of the internal resonator in the tire circumferential direction,
wherein a volume of the second auxiliary groove of the external resonator is smaller than a volume of the first auxiliary groove of the internal resonator, and a number of the external resonators to be arranged in the tire circumferential direction is larger than a number of the internal resonators to be arranged in the tire circumferential direction.

2. The tire according to claim 1, comprising at least two circumferential main grooves, wherein a groove width of the circumferential main groove on a vehicle-installed innermost side is maximum among the circumferential main grooves.

3. The tire according to claim 1, wherein the hidden groove of the first branch groove overlaps with the second auxiliary groove in the tire width direction.

4. The tire according to claim 1, wherein a groove depth of the first auxiliary groove is minimum in a portion adjacent to the first branch groove.

5. The tire according to claim 2, wherein the hidden groove of the first branch groove overlaps with the second auxiliary groove in the tire width direction.

6. The tire according to claim 2, wherein a groove depth of the first auxiliary groove is minimum in a portion adjacent to the first branch groove.

7. The tire according to claim 3, wherein a groove depth of the first auxiliary groove is minimum in a portion adjacent to the first branch groove.

* * * * *